(12) United States Patent
Takeda et al.

(10) Patent No.: US 12,463,763 B2
(45) Date of Patent: Nov. 4, 2025

(54) CONFIGURATION OF A REFERENCE SIGNAL FOR SECONDARY CELL ACTIVATION

(71) Applicant: QUALCOMM Incorporated, San Diego, CA (US)

(72) Inventors: Kazuki Takeda, Tokyo (JP); Changhwan Park, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/813,826

(22) Filed: Jul. 20, 2022

(65) Prior Publication Data

US 2023/0043834 A1  Feb. 9, 2023

Related U.S. Application Data

(60) Provisional application No. 63/203,948, filed on Aug. 5, 2021.

(51) Int. Cl.
*H04L 5/00* (2006.01)

(52) U.S. Cl.
CPC .......... *H04L 5/0048* (2013.01); *H04L 5/0096* (2013.01)

(58) Field of Classification Search
CPC ..... H04L 5/001; H04L 5/0048; H04L 5/0094; H04L 5/0098; H04L 5/0051; H04L 5/0096

See application file for complete search history.

(56) References Cited

U.S. PATENT DOCUMENTS

| 2016/0227519 | A1 | 8/2016 | Nimbalker et al. |
| 2022/0022176 | A1* | 1/2022 | Chen ................ H04W 52/0229 |
| 2022/0225215 | A1* | 7/2022 | Babaei .................. H04W 76/15 |
| 2023/0422165 | A1* | 12/2023 | Sun ......................... H04L 5/001 |
| 2024/0080169 | A1* | 3/2024 | He ......................... H04L 5/0048 |

FOREIGN PATENT DOCUMENTS

| CN | 111934837 A | 11/2020 |
| WO | 2021258089 A2 | 12/2021 |
| WO | 2022155620 A2 | 7/2022 |

OTHER PUBLICATIONS

Moderator (Mediatek): "Email Discussion on Reply LS for TCI State Indication at Direct SCell Activation", R1-21xxxxx, 3GPP TSG RAN WG1 #104-e, e-Meeting, Jan. 25-Feb. 5, 2021, 6 Pages.
International Search Report and Written Opinion—PCT/US2022/037883—ISA/EPO—Nov. 23, 2022.

(Continued)

*Primary Examiner* — Mansour Oveissi
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a trigger state associated with a configuration for receiving one or more secondary cell (SCell) activation reference signals. The UE may receive the one or more SCell activation reference signals based at least in part on the configuration. Numerous other aspects are described.

30 Claims, 10 Drawing Sheets

(56) References Cited

OTHER PUBLICATIONS

Nokia., et al., "On Low Latency Scell Activation", 3GPP TSG RAN WG1 #102, R1-2005908, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, 4 Pages, XP051915075, paragraph [2.2.1].

Qualcomm Incorporated: "Efficient Activation/De-Activation Mechanism for SCells in NR CA", 3GPP TSG RAN WG1 Meeting #105-e, R1-2104699, 3rd Generation Partnership Project, Mobile Competence Centre, 650, Route Des Lucioles, F-06921 Sophia-Antipolis Cedex, France, RAN WG1, No. E-meeting, May 10, 2021-May 27, 2021, May 12, 2021, 7 Pages, XP052010950, paragraph [0001]—paragraph [0004].

* cited by examiner

CONFIGURATION OF A REFERENCE SIGNAL FOR SECONDARY CELL ACTIVATION

CROSS-REFERENCE TO RELATED APPLICATION

This patent application claims priority to U.S. Provisional Patent Application No. 63/203,948, filed on Aug. 5, 2021, entitled "CONFIGURATION OF A REFERENCE SIGNAL FOR SECONDARY CELL ACTIVATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuration of a reference signal for secondary cell activation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a trigger state associated with a configuration for receiving one or more secondary cell (SCell) activation reference signals. The method may include receiving the one or more SCell activation reference signals based at least in part on the configuration.

Some aspects described herein relate to a UE for wireless communication. The user equipment may include a memory and one or more processors coupled to the memory. The one or more processors may be configured to receive an indication of a trigger state associated with a configuration for receiving one or more SCell activation reference signals. The one or more processors may be configured to receive the one or more SCell activation reference signals based at least in part on the configuration.

Some aspects described herein relate to a non-transitory computer-readable medium that stores a set of instructions for wireless communication by a UE. The set of instructions, when executed by one or more processors of the UE, may cause the UE to receive an indication of a trigger state associated with a configuration for receiving one or more SCell activation reference signals. The set of instructions, when executed by one or more processors of the UE, may cause the UE to receive the one or more SCell activation reference signals based at least in part on the configuration.

Some aspects described herein relate to an apparatus for wireless communication. The apparatus may include means for receiving an indication of a trigger state associated with a configuration for receiving one or more SCell activation reference signals. The apparatus may include means for receiving the one or more SCell activation reference signals based at least in part on the configuration.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
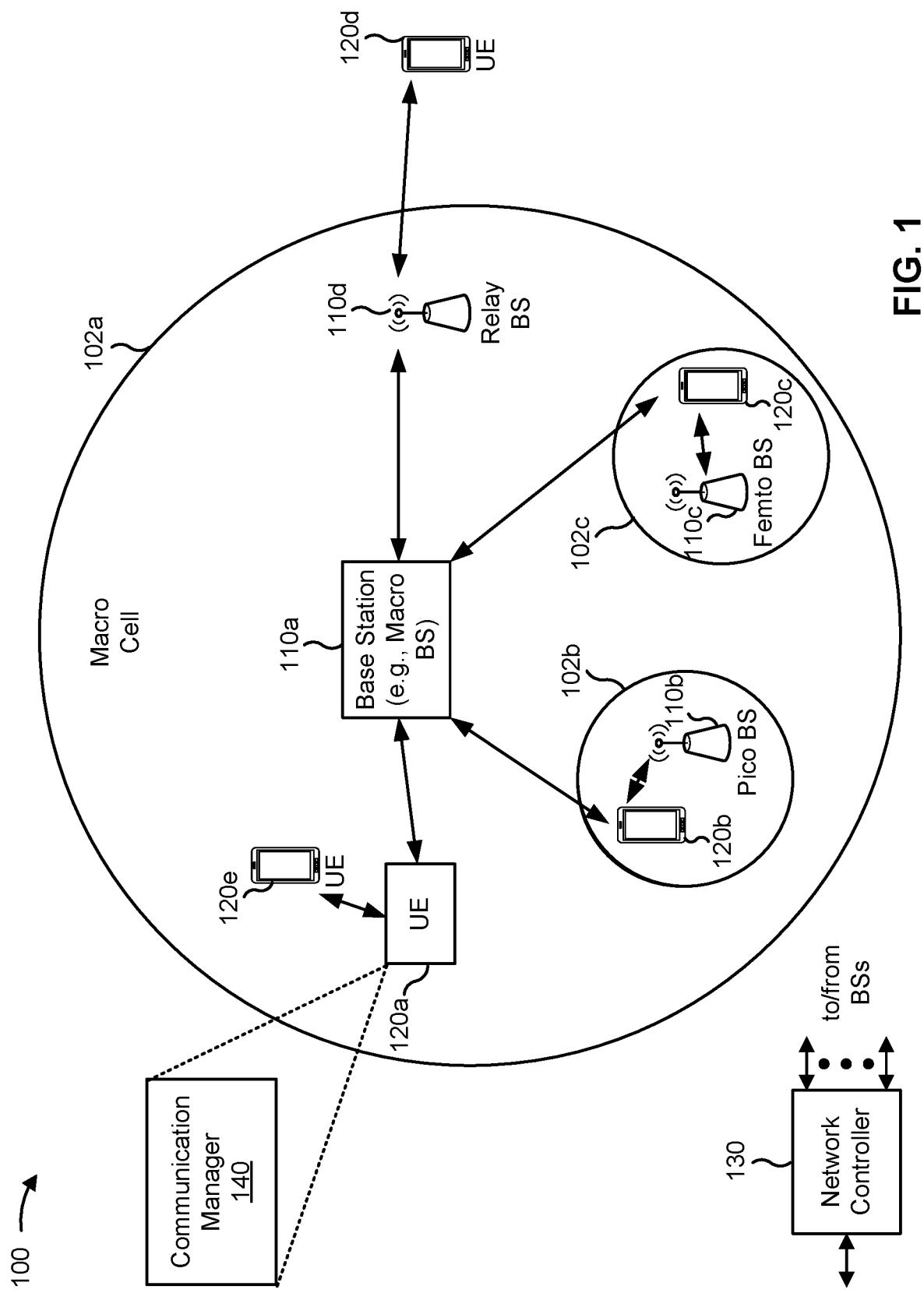
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more centralized units (CUs), one or more distributed unites (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive an indication of a trigger state associated with a configuration for receiving one or more secondary cell (SCell) activation reference signals; and receive the one or more SCell activation reference signals based at least in part on the configuration. Additionally, or alternatively, the communication manager 140 may perform one or more other operations described herein.

As indicated above, FIG. 1 is provided as an example. Other examples may differ from what is described with regard to FIG. 1.

Figure 2:
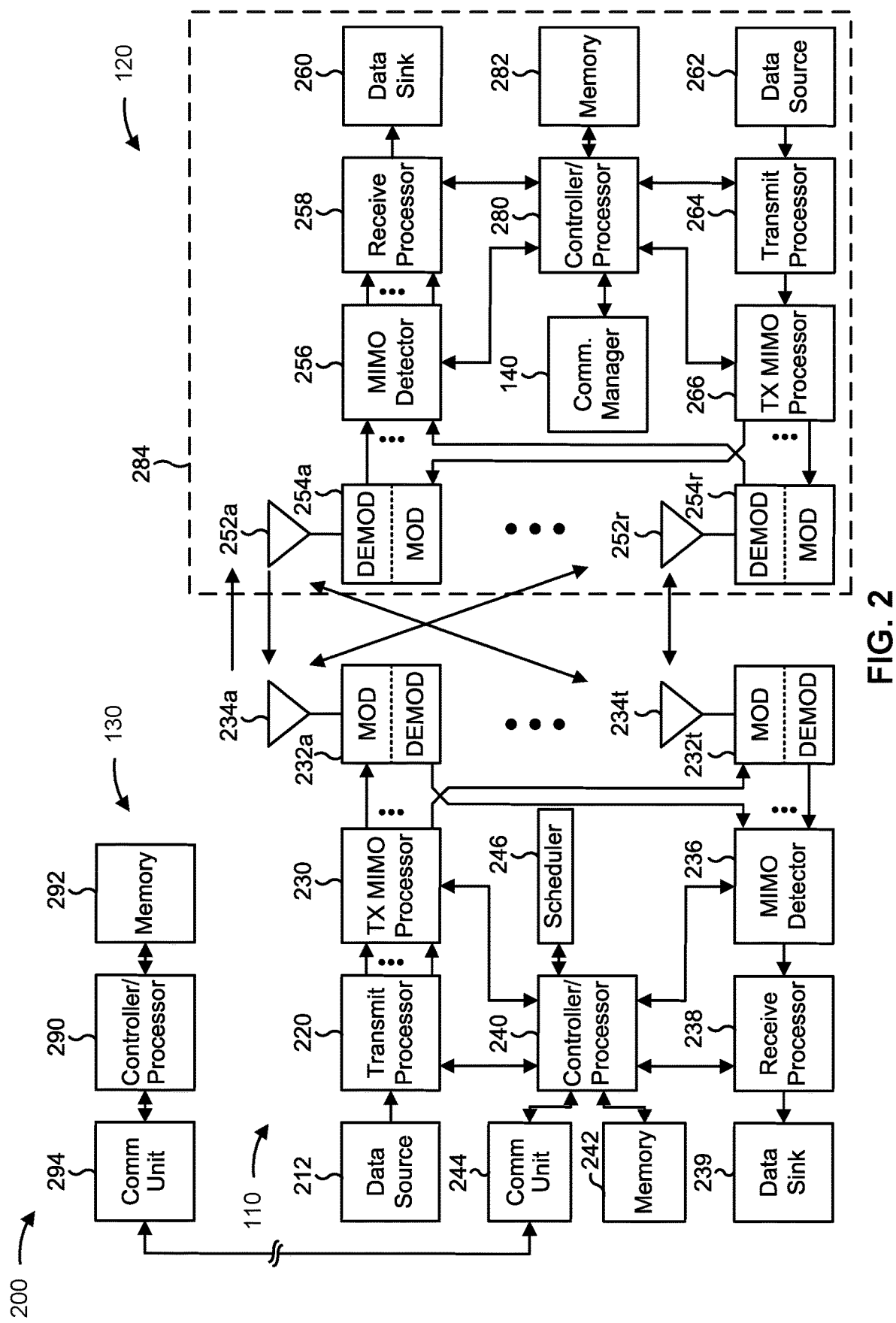
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with configuration of a reference signal for secondary cell activation, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving an indication of a trigger state associated with a configuration for receiving one or more SCell activation reference signals; and/or means for receiving the one or more SCell activation reference signals based at least in part on the configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
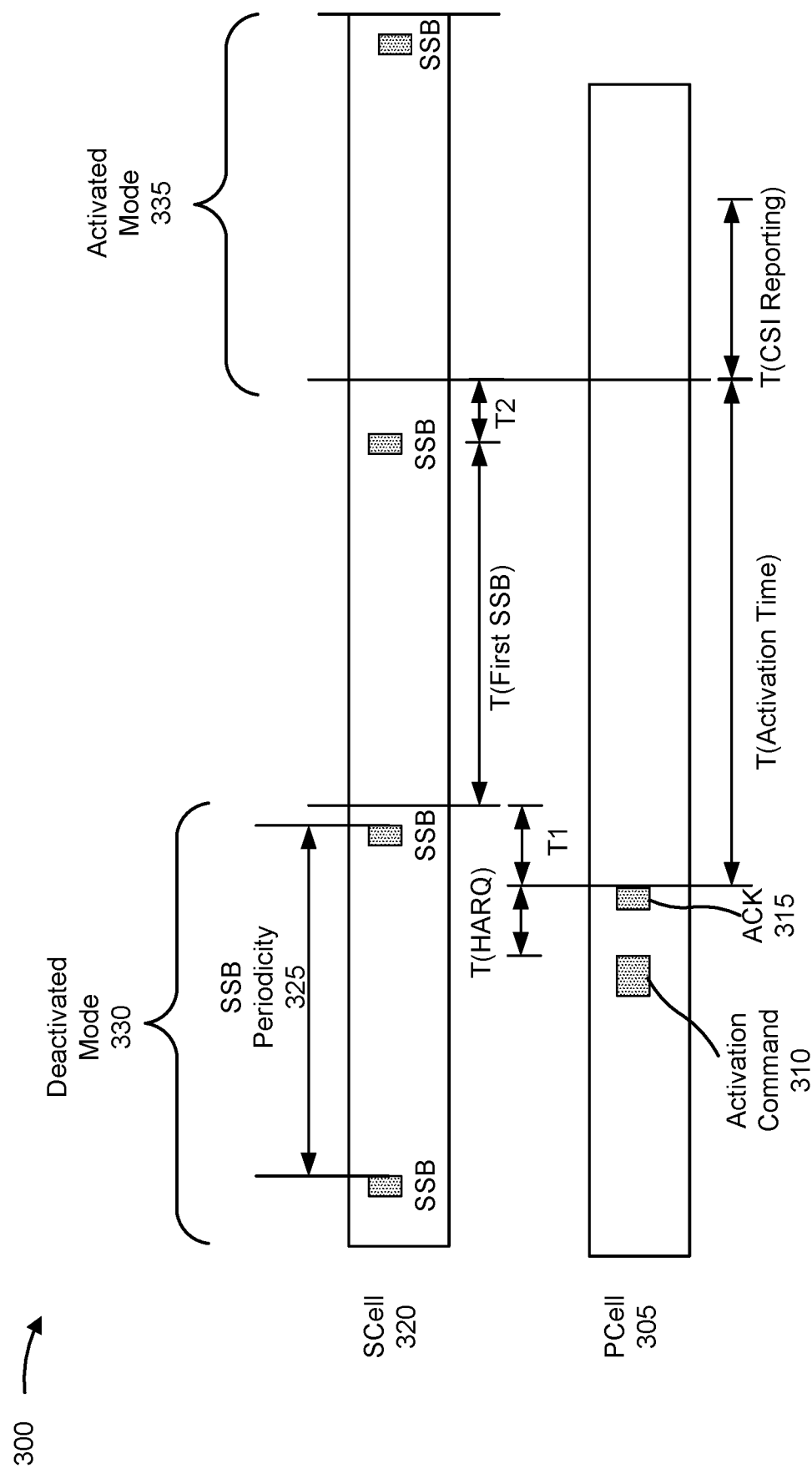
FIG. 3 is a diagram illustrating an example of activation of a secondary cell, in accordance with the present disclosure.

FIG. 3 is a diagram illustrating an example of activation of a secondary cell, in accordance with the present disclosure.

As shown in FIG. 3, a UE and a network node (e.g., a base station, a CU, a DU, and/or an RU) may communicate via a primary cell 305 (PCell). The UE may receive, and the network node may transmit via the PCell 305, an activation command 310 that indicates that the UE is to activate an SCell. The UE may transmit, and the network node may receive, an acknowledgement (ACK) 315 as part of a hybrid automatic repeat request (HARD) communication to indicate that the UE decoded the activation command 310 and is to attempt to activate the SCell. A time duration (T(HARQ)) between receiving the activation command 310 and transmitting the ACK 315 may be indicated in the activation command 310 or may be configured via another communication (e.g., in radio resource control (RRC) signaling or in a communication standard, among other examples), among other examples.

As further shown in FIG. 3, the UE may be configured to communicate with the network node via an SCell 320. The UE may be configured with a single SCell or with multiple SCells that may be activated by the network node for subsequent communication (e.g., in addition to communications via the PCell 305). The network node may transmit synchronization signal blocks (SSBs) via the SCell at an SSB periodicity 325.

The SCell 320 may be in a deactivated mode 330 until expiration of a time T1 from UE transmission of the ACK 315, may be in a transition mode after the expiration of the time T1 from the UE transmission of the ACK 315, and may be in an activated mode 335 after expiration of a time T2 from a next SSB following the expiration of the time T1 from the UE transmission of the ACK 315. The times T1 and T2 may be configured for the UE (e.g., via a communication standard or via RRC signaling, among other examples). For example, T1 may be configured to be 3 milliseconds, and T2 may be configured to be 2 milliseconds. A total amount of time between transmission of the ACK 315 until initiating the activated mode 335 (e.g., an activation time (T(activation time))) may be a sum of T1, T2, and an amount of time until the next SSB following the expiration of the time T1 from the UE transmission of the ACK 315 (T(First SSB)). After initiating the activated mode 335, the UE may wait an amount of time until a next channel state information (CSI) reporting occasion (T(CSI reporting)).

Based at least in part a duration of the T(activation time), a UE and network node may have an unnecessarily long delay before being able to communicate via the SCell. Based at least in part on the unnecessarily long delay, the UE and network node may only communicate via the PCell, which may have an insufficient data rate to carry data that is buffered for communication between the UE and the network node. The data may be stale (e.g., expired) by the time the UE and the network node are able to communicate the data, which may increase errors in communications between the UE and the network node. The errors and/or the unnecessary delay may cause consumption of computing, communication, network, and/or power resources to detect and correct.

As indicated above, FIG. 3 is provided as an example. Other examples may differ from what is described with regard to FIG. 3.

In some aspects described herein, a UE may receive an indication of a trigger state associated with a configuration for receiving one or more SCell activation reference signals. For example, the UE may receive a medium access control (MAC) control element (MAC CE)-based activation command from the network node. The trigger state may be associated with a set of one or more parameters associated with communication (e.g., a configuration of the one or more SCell activation reference signals and/or timing of transmission of the one or more SCell activation reference signals, among other examples). The UE may identify which trigger state was used when receiving the indication of the trigger state (e.g., a MAC CE command) for the one or more SCell activation reference signals. The network node may use the indication of the trigger state to indicate the one or more parameters for receiving the SCell activation reference signals.

The trigger state may be indicated from a set of multiple candidate trigger states. In some aspects, the trigger state may be associated with one or more resource sets. The one or more resources sets, respectively, may be associated with one or more resources 710 that indicate a configuration for receiving one or more SCell activation reference signals. In this way, a codepoint (e.g., with Nbits having $2^N$ codepoints for $2^N$ candidate sets of SCell activation reference signals) or an indication with Nbits of a bitmap (e.g., with N candidate sets of SCell activation reference signals) may indicate the one or more resources for receiving the one or more SCell activation reference signals with a relatively low amount of overhead when compared to explicit indications of the one or more resources.

In some aspects, a downlink bandwidth part where the one or more SCell activation reference signals are triggered (e.g., over which the UE is to receive) may be based at least in part on an RRC parameter (e.g., firstActiveDownlinkBWP-Id) that is a first active downlink bandwidth part configured by RRC signaling when the SCell is activated (e.g., configured). Alternatively, the downlink bandwidth part where the one or more SCell activation reference signals are triggered may be based at least in part on an RRC parameter (bwp-id) in another parameter (CSI-ResourceConfig) that is configured for the one or more SCell activation reference signals (e.g., a downlink bandwidth part is to be active based at least in part on a downlink bandwidth part on which the one or more SCell activation reference signals are triggered).

In some aspects, a carrier (e.g., an SCell) where the one or more SCell activation reference signals are triggered (e.g., over which the UE is to receive) may be based at least in part on the indication of the trigger state or an indication in a same communication as the trigger state (e.g., MAC CE-based signaling). For example, the communication (e.g., the MAC CE-based signaling) may include a first field and/or command to trigger the one or more SCell activation reference signals and a second field the indicates an SCell activation command. The SCell activation command may indicate activation of one or more SCells. The UE may determine that the one or more SCell activation reference signals are triggered on one or more SCells that are indicated to be activated in the communication.

In some aspects, a carrier where the one or more SCell activation reference signals are triggered (e.g., over which the UE is to receive) may be based at least in part on an RRC parameter (e.g., carrier) in another field (e.g., CSI-ReportConfig) that is associated with the trigger state. In some aspects, the UE may determine which SCells are to be activated based at least in part on additional signaling (e.g., additional MAC CE-based signaling) and the carriers where the one or more SCell activation reference signals are triggered may be different from the SCells to be activated. For example, SCells 1, 2, and 3 may be activated, and SCell activation reference signals may be triggered on SCell 1 and SCell 3. In another example, SCells 1, 2, and 3 may be activated, and SCell activation reference signals may not be triggered at any SCells. In yet another example, SCells 1, 2, and 3 may be activated, and SCell activation reference signals may be triggered on SCell 4 which has already been activated.

In some aspects, reference signals may include non-zero-power (NZP) CSI reference signals (NZP-CSI-RSs). In some aspects, NZP-CSI-RS resources, NZP-CSI-RS resource sets (e.g., including one or more NZP-CSI-RS resources), and/or triggering states for the one or more SCell activation reference signals may be different from NZP-CSI-RS resources, NZP-CSI-RS resource sets, and/or triggering states for aperiodic CSI-RS and/or tracking reference signals (TRSs). In some aspects, different pools of NZP-CSI-RS resources may be configured for the one or more SCell activation reference signals (e.g., candidate reference signals) than for aperiodic CSI-RSs and/or TRSs. For example, a first number of NZP-CSI-RS resources may be configured for the one or more SCell activation reference signals and a second number, that is different from the first number, of NZP-CSI-RS resources may be configured for the aperiodic CSI-RSs and/or TRSs. In another example, a first set of NZP-CSI-RS resource sets may be configured for the one or more SCell activation reference signals and a second set, that is different from the first set, of NZP-CSI-RS resources may be configured for the aperiodic CSI-RSs and/or TRSs. In yet another example, a first number of trigger states may be configured for the one or more SCell activation reference signals and a second set, that is different from the first set, of trigger states may be configured for the aperiodic CSI-RSs and/or TRSs.

In some aspects, a common set of NZP-CSI-RS resources may be configured for the one or more SCell activation reference signals and for the aperiodic CSI-RSs and/or TRSs. The NZP-CSI-RS resources may be grouped into a first set of NZP-CSI-RS resource sets for the one or more SCell activation reference signals and may also be grouped into a second set, that is different from the first set, of NZP-CSI-RS resource sets for the aperiodic CSI-RSs and/or TRSs.

In some aspects, a common set of NZP-CSI-RS resource sets may be configured for the one or more SCell activation reference signals and for the aperiodic CSI-RSs and/or TRSs. The NZP-CSI-RS resource sets may be grouped into a first set of trigger states for the one or more SCell activation reference signals and may also be grouped into a second set, that is different from the first set, of trigger states for the aperiodic CSI-RSs and/or TRSs.

In some aspects, a common set of trigger states may be configured for the one or more SCell activation reference signals and for the aperiodic CSI-RSs and/or TRSs.

In some aspects, a reference timing for triggering an offset (e.g., between the indication of the trigger state and a start of the one or more SCell activation reference signals or between the transmission of an ACK for the indication of the trigger state and the start of the one or more SCell activation reference signals, among other examples) may be a last downlink slot of an SCell to be activated that overlaps with a slot n+k as defined in technical specification (TS) 38.213 subclause 4.3. In some aspects, for the one or more SCell activation reference signals, an indication (e.g., aperiodic-TriggeringOffset or aperiodicTriggeringOffset-r16) may be configured in each NZP-CSI-RS resource set in a same manner as an aperiodic CSI-RS or TRS, with the value (e.g., k) being interpreted as a number of slots from a last downlink slot of the SCell to be activated that overlaps with slot n+k as defined in 38.213 sub-clause 4.3. Alternatively, a new parameter indicating the offset may be introduced per NZP-CSI-RS resource set, per trigger state, or per SCell activation reference signal, whose value indicates a number of slots from (e.g., relative to a reference time) the last downlink slot of the SCell to be activated that overlaps with slot n+k as defined in TS 38.213 sub-clause 4.3.

In some aspects, a UE may generate (e.g., construct) candidate SCell activation reference signals based at least in part on TRSs. For example, the UE may generate one or more TRSs (e.g., using TRS information (TRS-info)) and then use the generated one or more TRSs to generate the candidate SCell activation reference signals (e.g., including the one or more SCell activation reference signals). In some aspects, a triggering offset may be configured per TRS, per SCell activation reference signal, or per trigger state.

Based at least in part on the UE determining resources for receiving the one or more SCell activation reference signals via the indication of the trigger state, the UE and the network node may conserve computing, network, power, and/or communications resources that may have otherwise been consumed to receive an explicit indication of the resources. Based at least in part on using the one or more SCell activation reference signals to activate the SCell, the UE and the network node may begin communicating via the SCell with a decreased latency, which may support communication of time-sensitive data before expiration of the time-sensitive data. In this way, the UE and the network node may conserve resources that may have otherwise been consumed by detecting and correcting communication errors caused by, for example, stale data.

Figure 4:
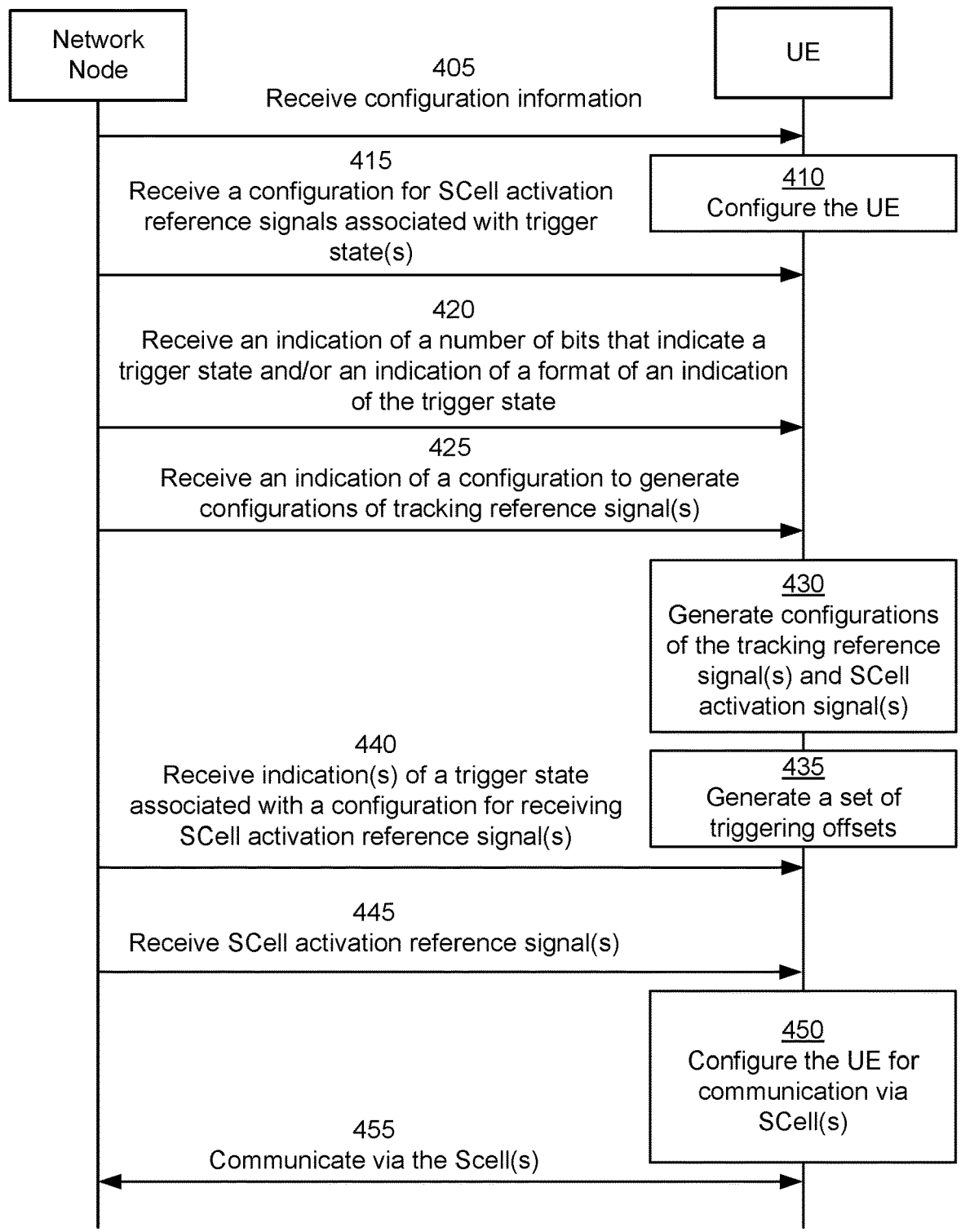
FIGS. 4-8 are diagrams illustrating examples associated with configuration of a reference signal for secondary cell activation, in accordance with the present disclosure.

FIG. 4 is a diagram illustrating an example associated with configuration of a reference signal for SCell activation, in accordance with the present disclosure. As shown in FIG. 4, a network node (e.g., base station 110, a CU, a DU, and/or an RU) may communicate with a UE (e.g., UE 120). In some aspects, the network node and the UE may be part of a wireless network (e.g., wireless network 100). The UE may be configured with one or more SCells that may be activated for communication with the network node.

As shown by reference number 405, the network node may transmit, and the UE may receive, configuration information. In some aspects, the UE may receive the configuration information via one or more of RRC signaling, MAC CEs, and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to receive one or more SCell activation reference signals based at least in part on receiving an indication of a trigger state associated with activation of an SCell. In some aspects, the configuration information may configure one or more SCells that may be activated for communication between the UE and the network node.

As shown by reference number 410, the UE may configure the UE based at least in part on the configuration information. In some aspects, the UE may be configured to perform one or more operations described herein based at least in part on the configuration information.

As shown by reference number 415, the UE may receive, and the network node may transmit, a configuration for SCell activation reference signals associated with a trigger state. In some aspects, the configuration for the SCell activation reference signals may include configurations of sets of candidate SCell activation reference signal resources. In some aspects, the configuration may indicate associations of the sets of candidate SCell activation reference signal resources with sets of candidate SCell activation reference signal resource sets. In some aspects, the configuration may indicate associations of the sets of candidate SCell activation reference signal resource sets with trigger states that may be indicated via an indication (e.g., MAC CE-based signaling and/or an activation command).

As shown by reference number 420, the UE may receive, and the network node may transmit, an indication of a number of bits that indicate a trigger state and/or an indication of a format for an indication of the trigger state. In some aspects, the bits that indicate the trigger state may be based at least in part on a number of candidate trigger states and/or the format for the indication of the trigger state. The format for the indication of the trigger state may include a bitmap format (e.g., a mapping of bits to the candidate trigger states) or a codepoint (e.g., values of all of the bits being mapped to different candidate trigger states), among other examples.

As shown by reference number 425, the UE may receive, and the network node may transmit, an indication of a configuration (e.g., indicating one or more parameters) to generate configurations (e.g., derive configurations) of one or more TRSs. In some aspects, the indication may include TRS information that is configured for use to generate the configurations of the one or more TRSs. In some aspects, the generated configuration indicates a time and/or frequency for receiving the one or more TRSs, if triggered. In some aspects, the time and/or frequency may be relative to a time and/or frequency of a communication, such as an activation command and/or an indication of a trigger state.

As shown by reference number 430, the UE may generate the configurations of the one or more TRSs and may generate one or more SCell activation signals. In some aspects, the UE may generate the one or more TRSs (e.g., configurations for receiving the TRSs). The UE may generate the SCell activation signals based at least in part on the one or more TRSs. For example, the SCells (e.g., SCell resources that may be triggered by an activation command and/or an indication of a trigger state) may be a same set of reference signals used for the TRSs or may be derived from the reference signals used for the TRSs (e.g., with offsets in time and/or frequencies from the reference signals used for the TRSs).

As shown by reference number 435, the UE may generate a set of triggering offsets associated with the candidate SCell activation reference signals. The triggering offsets may be durations of time from receiving the indication of the trigger state and/or activation command to receiving the one or more SCell activation reference signals.

As shown by reference number 440, the UE may receive, and the network node may transmit, one or more indications of a trigger state associated with a configuration for receiving the one or more SCell activation reference signals. In some aspects, the UE may receive the indication of the trigger state via a MAC CE command (e.g., an activation command). In some aspects, the indication of the trigger state includes a number of bits that indicate the trigger state from a set of candidate trigger states via a codepoint associated with the trigger state, or a bitmap value associated with the trigger state (e.g., based at least in part on a configuration for receiving the indication of the trigger state as indicated by the network node or via a communication protocol).

In some aspects, the UE may be configured with a number of candidate trigger states. The one or more indications of the trigger state associated with the configuration for receiving the one or more SCell activation reference signals may include a single indication (e.g., a single MAC CE communication) that includes a sufficient number of bits to indicate any one of the candidate trigger states. For example, the single indication may be configured with a flexible number of bits to provide the indication, with the number of bits being associated with the number of candidate trigger states. In some aspects, the number of bits to provide the indication (e.g., via a MAC CE communication) is different from a number of bits used to provide an indication of a trigger state for an aperiodic CSI-RS and/or a tracking reference signal (e.g., indicated via DCI). For example, the indication of the trigger state for an aperiodic CSI-RS and/or a tracking reference signal may use up to 6 bits (e.g., for indicating up to 63 candidate states), which the indication of the trigger state for receiving the one or more SCell activation signals may use more than 6 bits (e.g., 10 bits for up to 1023 candidate trigger states).

In some aspects, the UE may be configured with a number of candidate trigger states that exceeds a number of unique bit values of the indication. For example, if the indication is configured with 6 bits and the number of candidate trigger states is greater than 63, the indication does not support an indication of each of the candidate trigger states. In some aspects, the UE may receive a sub-selection before receiving the indication of the trigger state. In other words, the one or more indications of the trigger state associated with the configuration for receiving the one or more SCell activation reference signals may include a first indication of a sub-selection and a second indication of the trigger state. For example, the first indication may indicate a subset of the candidate trigger states, with the subset having a number of candidate trigger states that is less than or equal to a number of unique bit values of the second indication.

In some aspects, the first indication is a new MAC CE or an RRC indication that is dedicated for a sub-selection for an indication of a trigger state for an SCell activation reference signal. In some aspects, the first indication is a MAC CE that may be used for a sub-selection for the indication of a trigger state for an SCell activation reference signal and/or for a sub-selection for an indication of a trigger state for an aperiodic CSI-RS and/or a tracking reference signal. In some aspects, the MAC CE of the first indication may include a field (e.g., an R field) that indicates whether the first indication applies to a sub-selection for an indication of a trigger state for an SCell activation reference signal or for an indication of a trigger state for an aperiodic CSI-RS and/or a tracking reference signal (e.g., using a single bit indication). In some aspects, the MAC CE of the first indication may include an indication of a sub-selection for the indication of a trigger state for an aperiodic CSI-RS and/or a tracking reference signal and an indication of a sub-selection for an indication of a trigger state for an SCell activation reference signal. For example, the MAC CE of the first indication may include an additional field, an additional set of fields, or extension of a field (e.g., one or more Ti fields) to concatenate sub-selection indication for the MAC CE for the SCell activation reference signal trigger state, in addition to the sub-selection indication for aperiodic CSI-RS/TRS trigger state indications via DCI.

In some aspects, the one or more SCell activation reference signals are located within a downlink bandwidth part indicated via a configuration of a first active downlink bandwidth part as indicated in a communication that is separate from the indication of the trigger state. In some aspects, the one or more SCell activation reference signals are located within a downlink bandwidth part indicated via an indication associated with the trigger state.

In some aspects, the configuration indicates one or more NZP-CSI-RS resources, of a set of candidate NZP-CSI-RS resources, for receiving the one or more SCell activation reference signals. The candidate NZP-CSI-RS resources may be grouped by associations with one or more NZP-CSI-RS resource sets of a set of candidate NZP-CSI-RS resource sets, and the one or more NZP-CSI-RS resource sets may be grouped by associations with one or more trigger states, of a set of candidate trigger states. In some aspects, the candidate NZP-CSI-RS resources are a different set of NZP-CSI-RS resources than a set of NZP-CSI-RS resource sets for aperiodic CSI-RSs or TRSs. In some aspects, the candidate NZP-CSI-RS resources are grouped by associations with one or more different NZP-CSI-RS resource sets for aperiodic CSI-RSs or TRSs. In some aspects, the NZP-CSI-RS resource sets are grouped by associations with one or more different trigger states for aperiodic CSI-RSs or tracking reference signals.

In some aspects, the configuration indicates a timing parameter of the one or more SCell activation reference signals with the timing parameter based at least in part on a timing offset associated with the trigger state.

As shown by reference number 445, the UE may receive, and the network node may transmit, the one or more SCell activation reference signals. In some aspects, the UE may receive the one or more SCell activation reference signals based at least in part on the configuration received in connection with reference number 440. In some aspects, the UE may use reference signal resources associated with the trigger state to receive the one or more SCell activation reference signals.

In some aspects, the one or more SCell activation reference signals are received via one or more SCells indicated via an indication received with the indication of the trigger state or an indication associated with the trigger state, among other examples. In some aspects, the one or more SCells are indicated via the indication associated with the trigger state and additional signaling. The additional signaling may indicate at least one SCell to be activated. In some aspects, one or more SCells to be activated include an SCell that is not one of the one or more SCells on which the one or more SCell activation reference signals are configured to be received.

In some aspects, a triggering offset between receiving the indication of the trigger state and a downlink slot containing the one or more SCell activation reference signals is based at least in part on an indication within NZP-CSI-RS resource sets associated with the trigger state, an indication associated with the one or more SCell activation reference signals, and/or an indication associated with the trigger state (e.g., in information associated with the trigger state before reception of the indication of the trigger state).

As shown by reference number 450, the UE may configure the UE for communication via the one or more SCells. In some aspects, the UE may activate one or more components of the UE to sample signals, demodulate signals, and/or decode signals using reference signal resources associated with the trigger state.

As shown by reference number 455, the UE and the network node may communicate via the one or more SCells. In some aspects, the UE may activate the SCell for communications with the network node. In some aspects, a data rate (e.g., a date bandwidth) may increase and/or a latency may improve based at least in part on activating the one or more SCells.

Based at least in part on the UE determining resources for receiving the one or more SCell activation reference signals via the indication of the trigger state, the UE and the network node may conserve computing, network, power, and/or communications resources that may have otherwise been consumed to receive an explicit indication of the resources. Based at least in part on using the one or more SCell activation reference signals to activate the SCell, the UE and the network node may begin communicating via the SCell with a decreased latency, which may support communication of time-sensitive data before expiration of the time-sensitive data. In this way, the UE and the network node may conserve resources that may have otherwise been consumed by detecting and correcting communication errors caused by, for example, stale data.

As indicated above, FIG. 4 is provided as an example. Other examples may differ from what is described with regard to FIG. 4.

Figure 5:
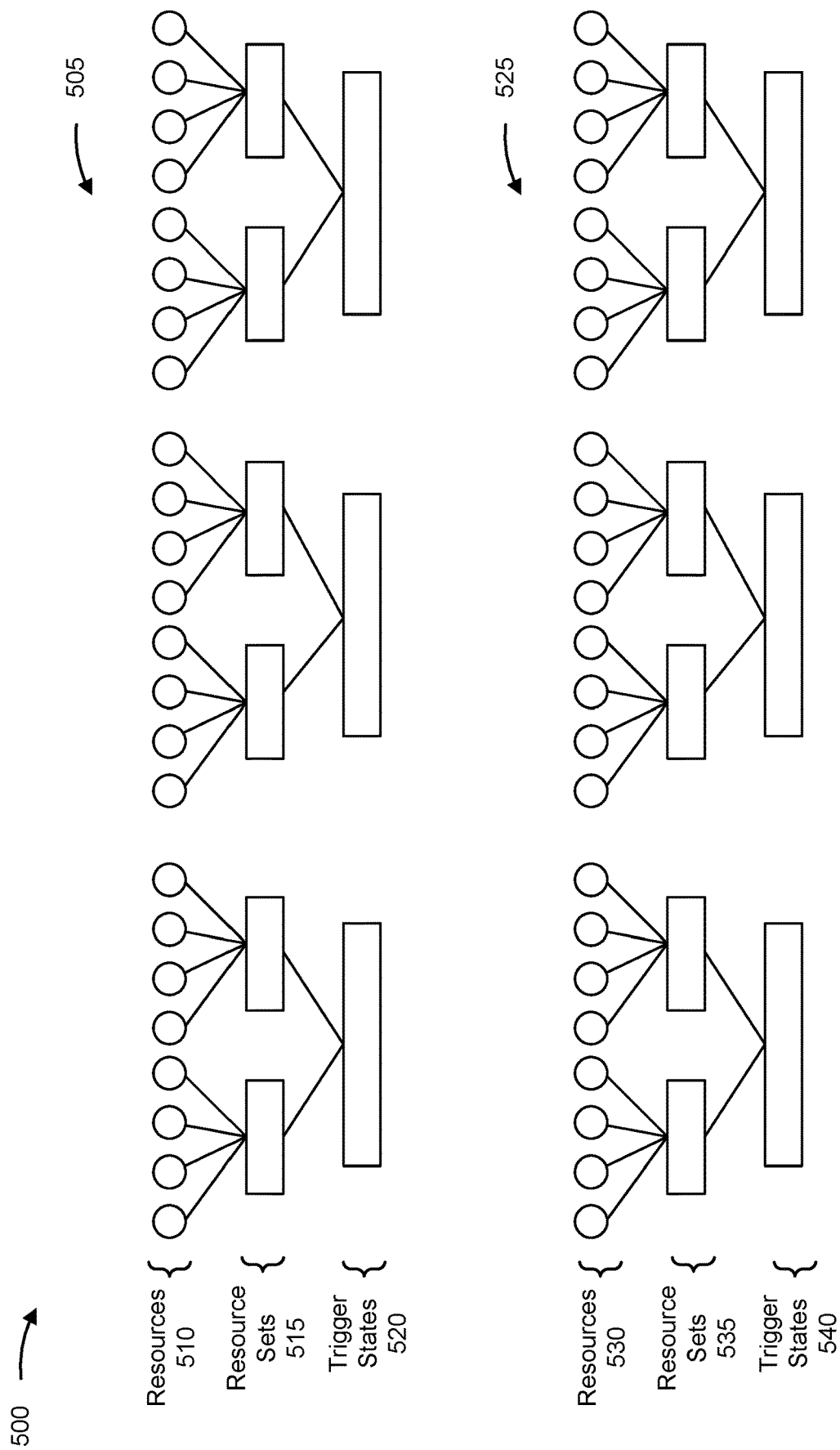

FIG. 5 is a diagram illustrating an example associated with configuration of a reference signal for SCell activation, in accordance with the present disclosure. As shown in FIG. 5, a network node (e.g., base station 110, a CU, a DU, and/or an RU) may communicate with a UE (e.g., UE 120). In some aspects, the network node and the UE may be part of a wireless network (e.g., wireless network 100). The UE may be configured with one or more SCells that may be activated for communication with the network node.

As shown in FIG. 5, a configuration 505 for grouping resources 510 (e.g., reference signal resources and/or NZP-CSI-RS resources) for SCell activation reference signals may include associating groups of the resources 510 with different resource sets 515 and may include associating groups of resource sets 515 with different trigger states 520.

As further shown in FIG. 5, a configuration 525 for grouping resources 530 (e.g., different resources than those of resources 510) for aperiodic CSI-RSs and/or TRSs may include associating groups of the resources 530 with different resource sets 535 and may include associating groups of resource sets 535 with different trigger states 540.

As indicated above, FIG. 5 is provided as an example. Other examples may differ from what is described with regard to FIG. 5.

Figure 6:
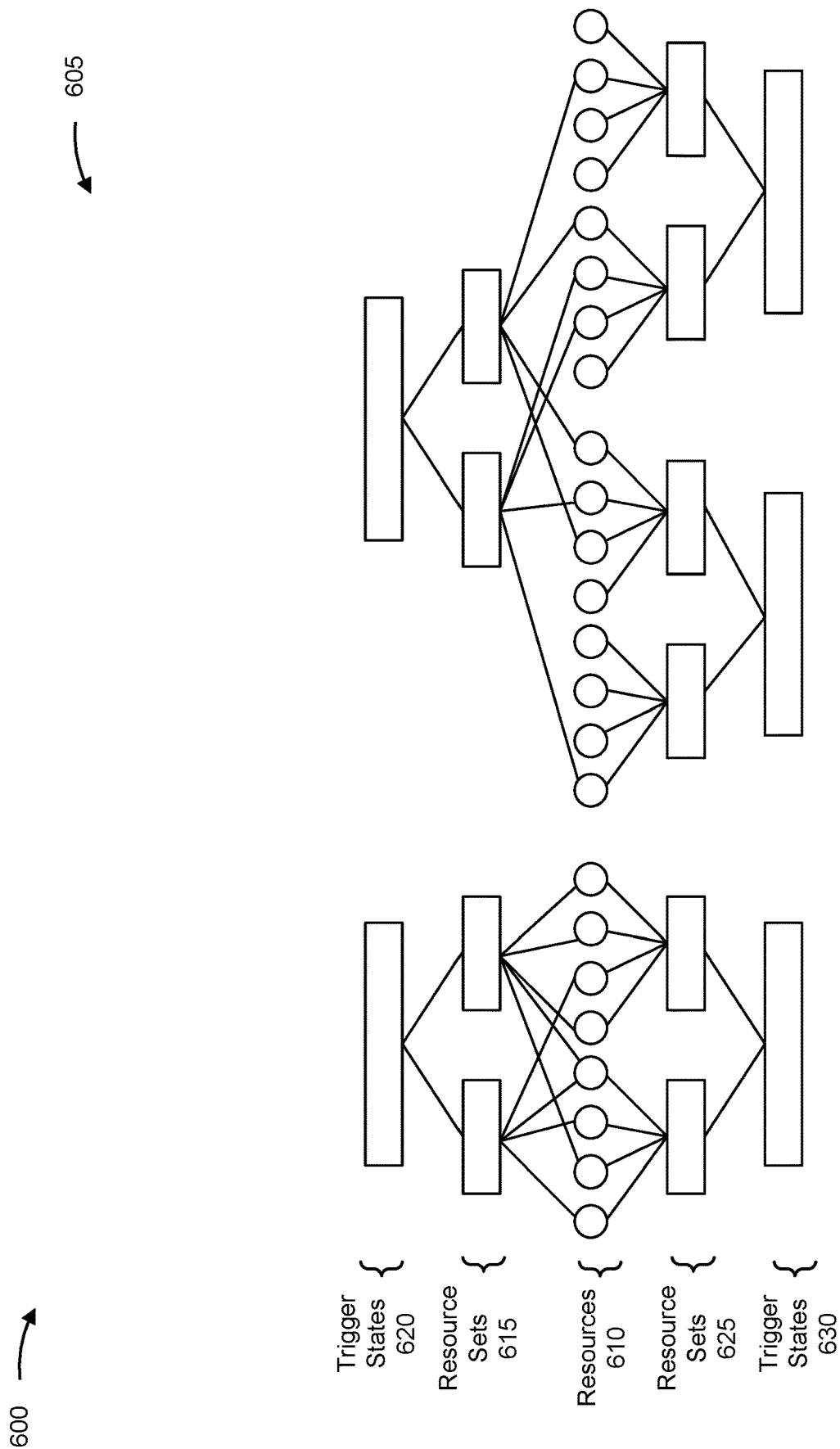

FIG. 6 is a diagram illustrating an example associated with configuration of a reference signal for SCell activation, in accordance with the present disclosure. As shown in FIG. 6, a network node (e.g., base station 110, a CU, a DU, and/or an RU) may communicate with a UE (e.g., UE 120). In some aspects, the network node and the UE may be part of a wireless network (e.g., wireless network 100). The UE may be configured with one or more SCells that may be activated for communication with the network node.

As shown in FIG. 6, a configuration 605 for grouping resources 610 (e.g., reference signal resources and/or NZP-CSI-RS resources) for SCell activation reference signals and for aperiodic CSI-RSs and/or TRSs may include associating groups of the resources 610 with different resource sets 615 for SCell activation reference signals and may include associating groups of resource sets 615 with different trigger states 620. The resources 610 may be grouped with a different grouping (e.g., with at least one difference) and associated with different resource sets 625 for aperiodic CSI-RSs and/or TRSs and may include associating groups of resource sets 625 with different trigger states 630.

As indicated above, FIG. 6 is provided as an example. Other examples may differ from what is described with regard to FIG. 6.

Figure 7:
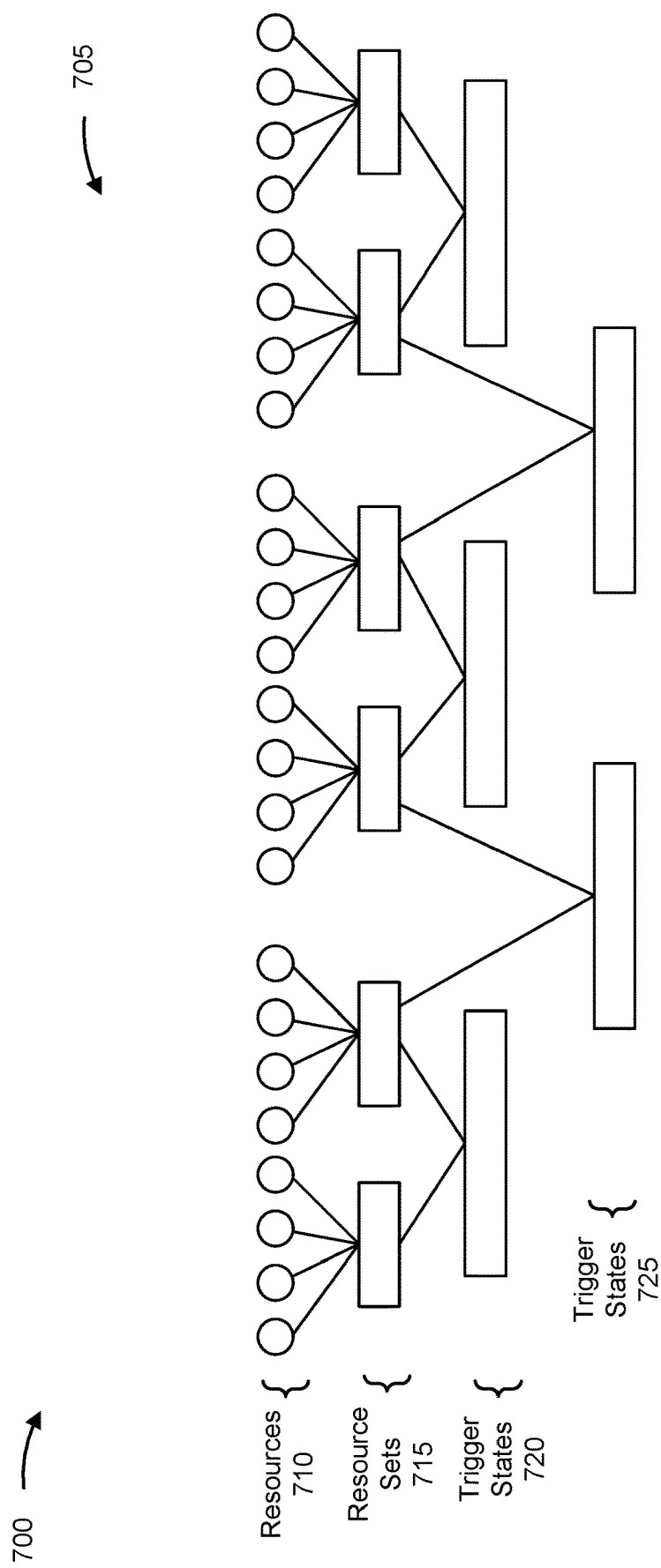

FIG. 7 is a diagram illustrating an example associated with configuration of a reference signal for SCell activation, in accordance with the present disclosure. As shown in FIG.

7, a network node (e.g., base station 110, a CU, a DU, and/or an RU) may communicate with a UE (e.g., UE 120). In some aspects, the network node and the UE may be part of a wireless network (e.g., wireless network 100). The UE may be configured with one or more SCells that may be activated for communication with the network node.

As shown in FIG. 7, a configuration 705 for grouping resources 710 (e.g., reference signal resources and/or NZP-CSI-RS resources) for SCell activation reference signals and for aperiodic CSI-RSs and/or TRSs may include associating groups of the resources 710 with different resource sets 715 for SCell activation reference signals and for aperiodic CSI-RSs and/or TRSs. The resource sets 715 may be grouped in a first grouping and associated with a first set of trigger states 720 for aperiodic CSI-RSs and/or TRSs. The resource sets 715 may also be grouped with a different grouping (e.g., with at least one difference) and associated with different trigger states 725 for SCell activation reference signals.

As indicated above, FIG. 7 is provided as an example. Other examples may differ from what is described with regard to FIG. 7.

Figure 8:
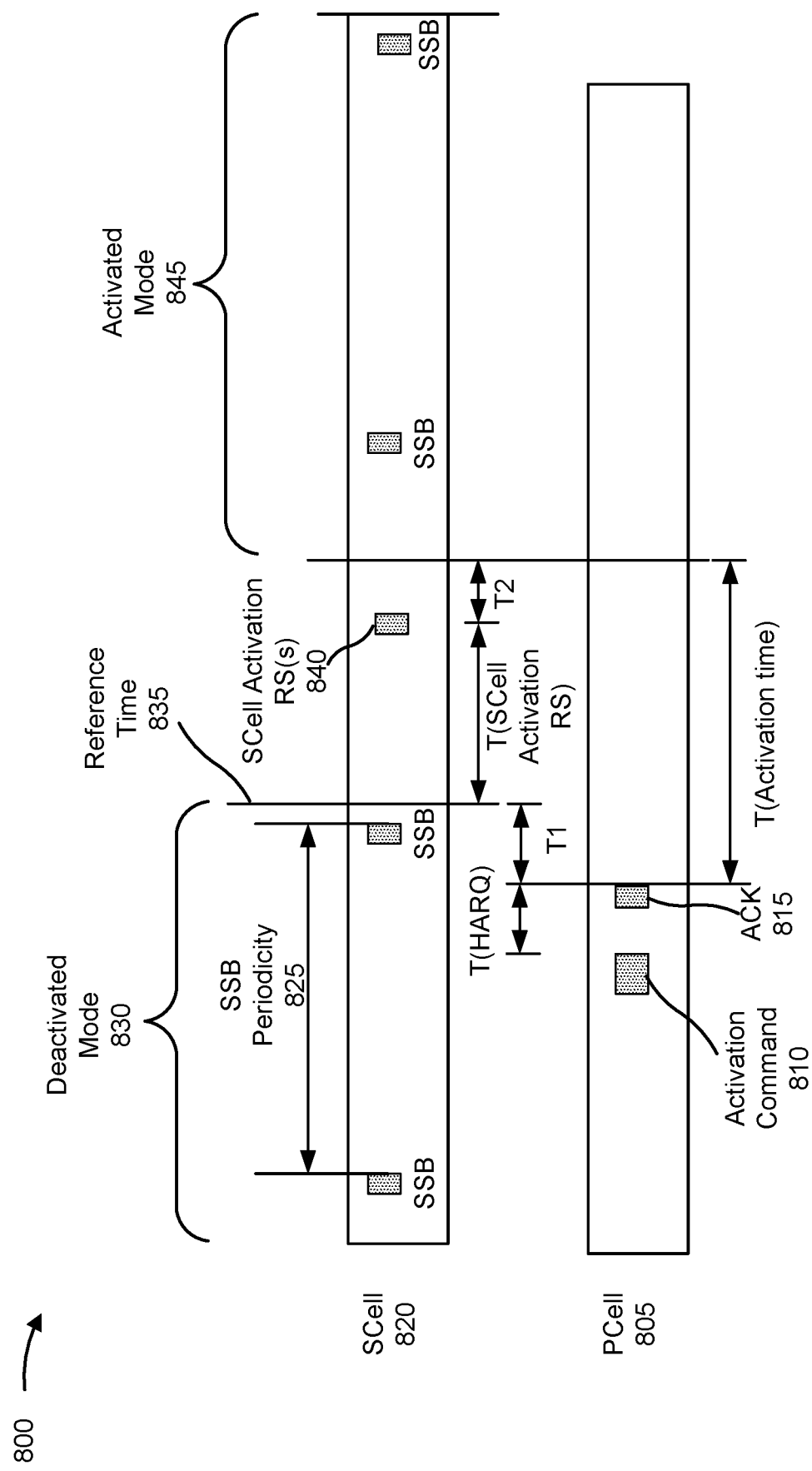

FIG. 8 is a diagram illustrating an example associated with configuration of a reference signal for SCell activation, in accordance with the present disclosure. As shown in FIG. 8, a network node (e.g., base station 110, a CU, a DU, and/or an RU) may communicate with a UE (e.g., UE 120). In some aspects, the network node and the UE may be part of a wireless network (e.g., wireless network 100). The UE may be configured with one or more SCells that may be activated for communication with the network node.

As shown in FIG. 8, a UE and a network node (e.g., base station 110, a CU, a DU, and/or an RU) may communicate via a PCell 805. The UE may receive, and the network node may transmit via the PCell 805, an activation command 810 that indicates that the UE is to activate an SCell. The UE may transmit, and the network node may receive, an ACK 815 as part of a HARQ communication to indicate that the UE decoded the activation command 810 and is to attempt to activate the SCell. A time duration (T(HARQ)) between receiving the activation command 810 and transmitting the ACK 815 may indicated in the activation command 810 or may be configured in a previous communication (e.g., in RRC signaling or in a communication standard, among other examples), among other examples.

As further shown in FIG. 8, the UE may be configured to communicate with the network node via an SCell 820. The UE may be configured with a single SCell or with multiple SCells that may be activated by the network node for subsequent communication (e.g., in addition to communications via the PCell 805). The network node may transmit SSBs via the SCell at an SSB periodicity 825.

The SCell 820 may be in a deactivated mode 830 until expiration of a time T1 from UE transmission of the ACK 815 and may be in a transition mode after the expiration of the time T1 from the UE transmission of the ACK 815. In some aspects, the UE may use a reference time 835 to determine when to receive one or more SCell activation reference signals 840. In some aspects, the reference time is based at least in part on expiration of the time T1. In this way, the UE may determine a time, independent from SSBs of the SCell 820, for receiving a reference signal to activate the SCell 820.

The UE may be in an activated mode 845 after expiration of a time T2 from receiving the one or more SCell activation reference signals 840. The times T1 and T2 may be configured for the UE (e.g., via a communication standard or via RRC signaling, among other examples). For example, T1 may be configured to be 3 milliseconds, and T2 may be configured to be 2 milliseconds. A total amount of time between transmission of the ACK 315 until initiating the activated mode 335 (e.g., an activation time (T(activation time))) may be a sum of T1, T2, and an amount of time until the next SSB following the expiration of the time T1 from the UE transmission of the ACK 315 (T(First SSB)). After initiating the activated mode 335, the UE may wait an amount of time until a next CSI reporting occasion (T(CSI reporting)).

As indicated above, FIG. 8 is provided as an example. Other examples may differ from what is described with regard to FIG. 8.

Figure 9:
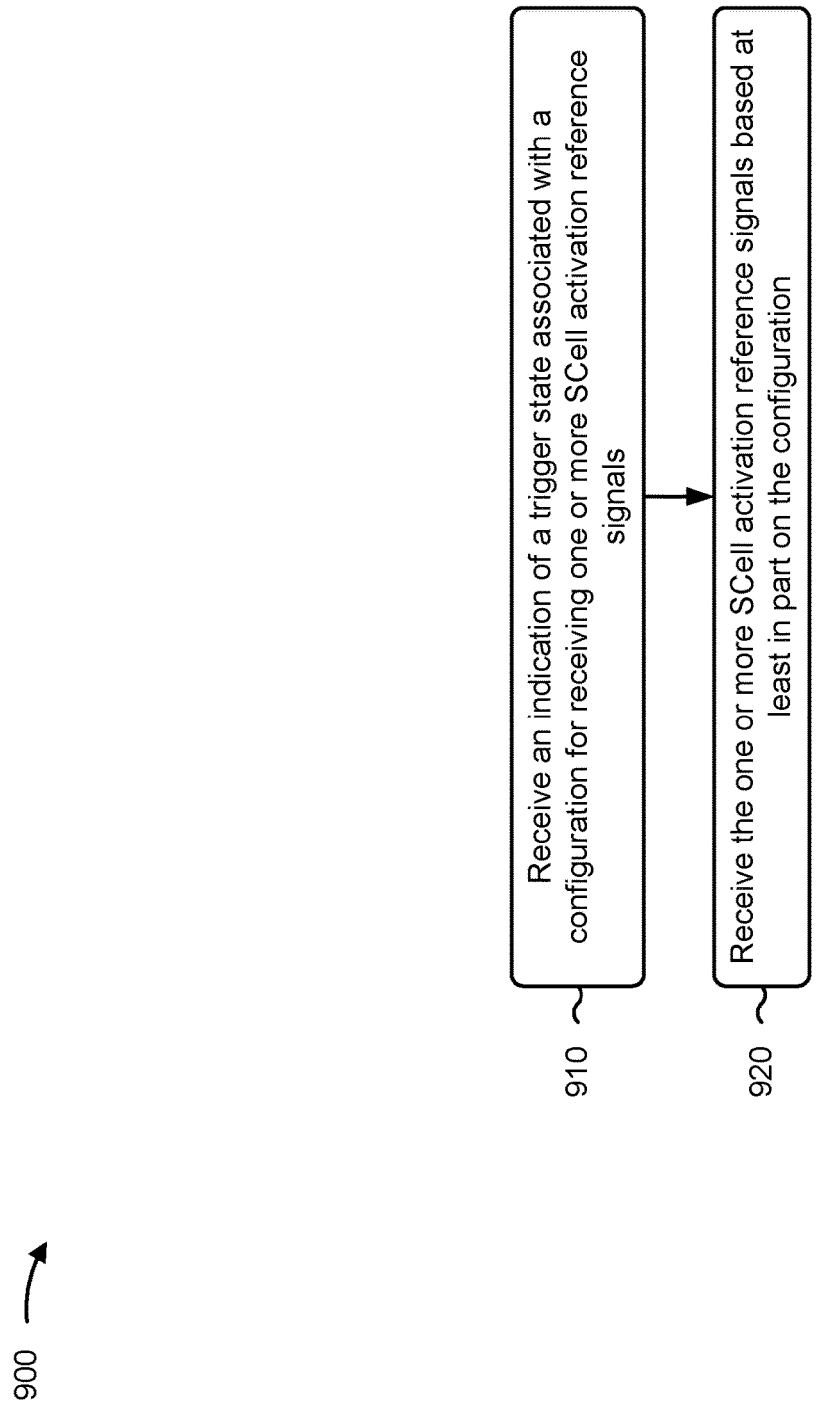
FIG. 9 is a diagram illustrating an example process associated with configuration of a reference signal for secondary cell activation, in accordance with the present disclosure.

FIG. 9 is a diagram illustrating an example process 900 performed, for example, by a UE, in accordance with the present disclosure. Example process 900 is an example where the UE (e.g., UE 120) performs operations associated with configuration of a reference signal for SCell activation.

As shown in FIG. 9, in some aspects, process 900 may include receiving an indication of a trigger state associated with a configuration for receiving one or more SCell activation reference signals (block 910). For example, the UE (e.g., using communication manager 140 and/or reception component 1002, depicted in FIG. 10) may receive an indication of a trigger state associated with a configuration for receiving one or more SCell activation reference signals, as described above.

As further shown in FIG. 9, in some aspects, process 900 may include receiving the one or more SCell activation reference signals based at least in part on the configuration (block 920). For example, the UE (e.g., using communication manager 140 and/or reception component 1002, depicted in FIG. 10) may receive the one or more SCell activation reference signals based at least in part on the configuration, as described above.

Process 900 may include additional aspects, such as any single aspect or any combination of aspects described below and/or in connection with one or more other processes described elsewhere herein.

In a first aspect, receiving the indication of the trigger state comprises receiving the indication of the trigger state via a MAC CE command.

In a second aspect, alone or in combination with the first aspect, the configuration for receiving the one or more SCell activation reference signals comprises one or more indications of a timing parameter of the one or more SCell activation reference signals, the timing parameter based at least in part on a timing offset associated with the trigger state.

In a third aspect, alone or in combination with one or more of the first and second aspects, the indication of the trigger state includes a number of bits that indicates the trigger state from a set of candidate trigger states via one or more of a codepoint associated with the trigger state, or a bitmap value associated with the trigger state.

In a fourth aspect, alone or in combination with one or more of the first through third aspects, process 900 includes one or more of receiving an indication of the number of bits that indicates the trigger state, or receiving an indication of a format of the indication of the trigger state.

In a fifth aspect, alone or in combination with one or more of the first through fourth aspects, the one or more SCell activation reference signals are located within a downlink bandwidth part indicated via one or more of a configuration of a first active downlink bandwidth part as indicated in a communication that is separate from the indication of the trigger state, or an indication associated with the trigger state.

In a sixth aspect, alone or in combination with one or more of the first through fifth aspects, the one or more SCell activation reference signals are received via one or more SCells indicated via one or more of an indication received with the indication of the trigger state, or an indication associated with the trigger state.

In a seventh aspect, alone or in combination with one or more of the first through sixth aspects, the one or more SCells are indicated via the indication associated with the trigger state and additional signaling, wherein the additional signaling indicates at least one SCell to be activated.

In an eighth aspect, alone or in combination with one or more of the first through seventh aspects, the at least one SCell to be activated includes an SCell that is not one of the one or more SCells.

In a ninth aspect, alone or in combination with one or more of the first through eighth aspects, the configuration indicates one or more NZP-CSI-RS resources, of a set of candidate NZP-CSI-RS resources, for receiving the one or more SCell activation reference signals, and wherein the candidate NZP-CSI-RS resources are grouped by associations with one or more NZP-CSI-RS resource sets of a set of candidate NZP-CSI-RS resource sets, and wherein the one or more NZP-CSI-RS resource sets are grouped by associations with one or more trigger states, of a set of candidate trigger states.

In a tenth aspect, alone or in combination with one or more of the first through ninth aspects, the candidate NZP-CSI-RS resources are a different set of NZP-CSI-RS resources than a set of NZP-CSI-RS resource sets for aperiodic CSI-RSs or tracking reference signals.

In an eleventh aspect, alone or in combination with one or more of the first through tenth aspects, the candidate NZP-CSI-RS resources are grouped by associations with one or more different NZP-CSI-RS resource sets for aperiodic CSI-RSs or tracking reference signals.

In a twelfth aspect, alone or in combination with one or more of the first through eleventh aspects, the NZP-CSI-RS resource sets are grouped by associations with one or more different trigger states for aperiodic CSI-RSs or tracking reference signals.

In a thirteenth aspect, alone or in combination with one or more of the first through twelfth aspects, a triggering offset between receiving the indication of the trigger state and a downlink slot containing the one or more SCell activation reference signals is based at least in part on one or more of an indication within one or more NZP-CSI-RS resource sets associated with the trigger state, an indication associated with the one or more SCell activation reference signals, or an indication associated with the trigger state.

In a fourteenth aspect, alone or in combination with one or more of the first through thirteenth aspects, process 900 includes receiving an indication of a configuration to generate configurations for one or more tracking reference signals, generating the configurations for the one or more tracking reference signals, and generating configurations for the one more SCell activation reference signals based at least in part on the one or more tracking reference signals.

In a fifteenth aspect, alone or in combination with one or more of the first through fourteenth aspects, process 900 includes generating a set of triggering offsets associated with one or more of the one or more tracking reference signals, the one or more SCell activation reference signals, or candidate trigger states.

In a sixteenth aspect, alone or in combination with one or more of the first through fifteenth aspects, process 900 includes receiving an indication of a sub-selection to indicate a subset of a set of candidate trigger states, wherein the indication of the trigger state indicates a selection of a candidate trigger state within the subset of the set of candidate trigger states.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
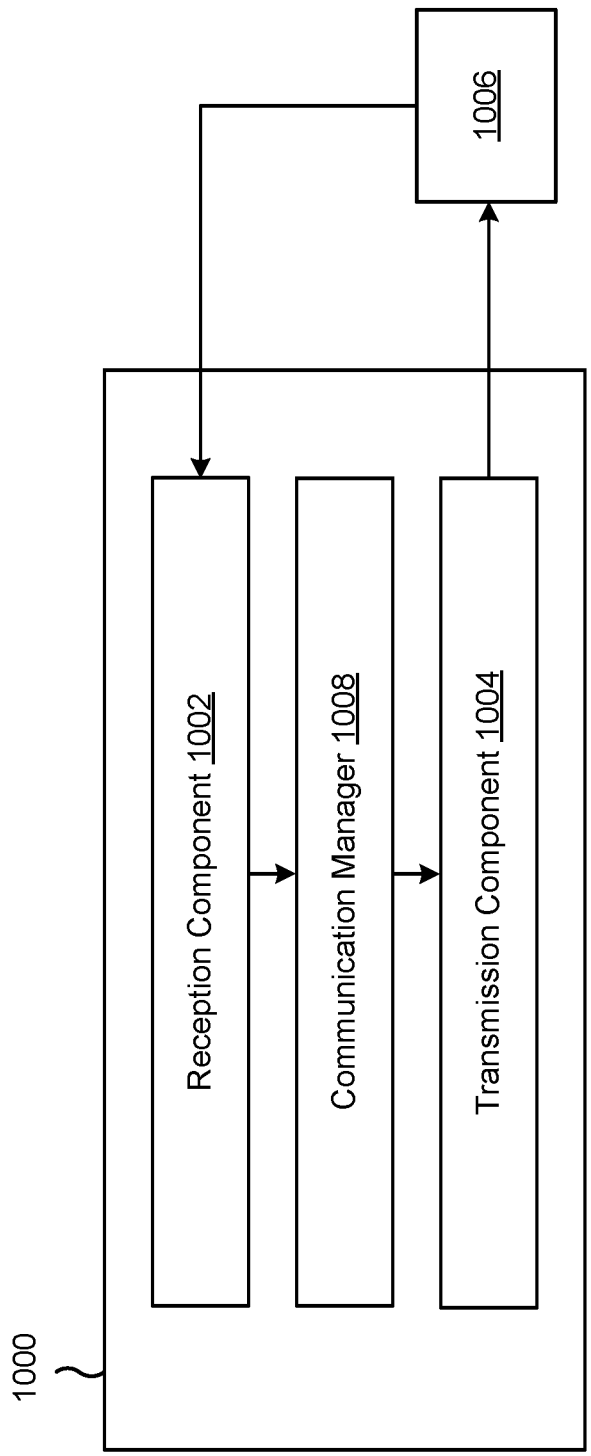
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 4-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive an indication of a trigger state associated with a configuration for receiving one or more SCell activation reference signals. The reception component 1002 may receive the one or more SCell activation reference signals based at least in part on the configuration.

The reception component 1002 may receive an indication of a configuration to generate configurations for one or more tracking reference signals.

The communication manager 1008 may generate the configurations for the one or more tracking reference signals.

The communication manager 1008 may generate configurations for the one more SCell activation reference signals based at least in part on the one or more tracking reference signals.

The communication manager 1008 may generate a set of triggering offsets associated with one or more of the one or more tracking reference signals, the one or more SCell activation reference signals, or candidate trigger states.

The reception component 1002 may receive an indication of a sub-selection to indicate a subset of a set of candidate trigger states, wherein the indication of the trigger state indicates a selection of a candidate trigger state within the subset of the set of candidate trigger states.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a trigger state associated with a configuration for receiving one or more secondary cell (SCell) activation reference signals; and receiving the one or more SCell activation reference signals based at least in part on the configuration.

Aspect 2: The method of Aspect 1, wherein receiving the indication of the trigger state comprises: receiving the indication of the trigger state via a medium access control control element (MAC CE) command.

Aspect 3: The method of any of Aspects 1-2, wherein the configuration for receiving the one or more SCell activation reference signals comprises one or more indications of: a timing parameter of the one or more SCell activation reference signals, the timing parameter based at least in part on a timing offset associated with the trigger state.

Aspect 4: The method of any of Aspects 1-3, wherein the indication of the trigger state includes a number of bits that indicates the trigger state from a set of candidate trigger states via one or more of: a codepoint associated with the trigger state, or a bitmap value associated with the trigger state.

Aspect 5: The method of Aspect 4, further comprising one or more of: receiving an indication of the number of bits that indicates the trigger state; or receiving an indication of a format of the indication of the trigger state.

Aspect 6: The method of any of Aspects 1-5, wherein the one or more SCell activation reference signals are located within a downlink bandwidth part indicated via one or more of: a configuration of a first active downlink bandwidth part as indicated in a communication that is separate from the indication of the trigger state, or an indication associated with the trigger state.

Aspect 7: The method of any of Aspects 1-6, wherein the one or more SCell activation reference signals are received via one or more SCells indicated via one or more of: an indication received with the indication of the trigger state, or an indication associated with the trigger state.

Aspect 8: The method of Aspect 7, wherein the one or more SCells are indicated via the indication associated with the trigger state and additional signaling, wherein the additional signaling indicates at least one SCell to be activated.

Aspect 9: The method of Aspect 8, wherein the at least one SCell to be activated includes an SCell that is not one of the one or more SCells.

Aspect 10: The method of any of Aspects 1-9, wherein the configuration indicates one or more non-zero-power channel state information reference signal (NZP-CSI-RS) resources, of a set of candidate NZP-CSI-RS resources, for receiving the one or more SCell activation reference signals, and wherein the candidate NZP-CSI-RS resources are grouped by associations with one or more NZP-CSI-RS resource sets of a set of candidate NZP-CSI-RS resource sets, and wherein the one or more NZP-CSI-RS resource sets are grouped by associations with one or more trigger states, of a set of candidate trigger states.

Aspect 11: The method of Aspect 10, wherein the candidate NZP-CSI-RS resources are a different set of NZP-CSI-RS resources than a set of NZP-CSI-RS resource sets for aperiodic CSI-RSs or tracking reference signals.

Aspect 12: The method of Aspect 10, wherein the candidate NZP-CSI-RS resources are grouped by associations with one or more different NZP-CSI-RS resource sets for aperiodic CSI-RSs or tracking reference signals.

Aspect 13: The method of Aspect 10, wherein the NZP-CSI-RS resource sets are grouped by associations with one or more different trigger states for aperiodic CSI-RSs or tracking reference signals.

Aspect 14: The method of any of Aspects 1-13, wherein a triggering offset between receiving the indication of the trigger state and a downlink slot containing the one or more SCell activation reference signals is based at least in part on one or more of: an indication within one or more non-zero-power channel state information reference signal (NZP-CSI-RS) resource sets associated with the trigger state, an indication associated with the one or more SCell activation reference signals, or an indication associated with the trigger state.

Aspect 15: The method of any of Aspects 1-14, further comprising: receiving an indication of a configuration to generate configurations for one or more tracking reference signals; generating the configurations for the one or more tracking reference signals; and generating configurations for the one more SCell activation reference signals based at least in part on the one or more tracking reference signals.

Aspect 16: The method of Aspect 15, further comprising generating a set of triggering offsets associated with one or more of: the one or more tracking reference signals, the one or more SCell activation reference signals, or candidate trigger states.

Aspect 17, The method of any of Aspects 1-15, further comprising receiving an indication of a sub-selection to indicate a subset of a set of candidate trigger states, wherein the indication of the trigger state indicates a selection of a candidate trigger state within the subset of the set of candidate trigger states.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, configured to:
        receive an indication of a trigger state associated with a configuration for receiving one or more secondary cell (SCell) activation reference signals, wherein the indication of the trigger state includes a number of bits that indicate the trigger state from a set of candidate trigger states via a codepoint associated with the trigger state, and wherein the one or more SCell activation reference signals are located within a downlink bandwidth part indicated via a configuration of a first active downlink bandwidth part as indicated in a communication that is separate from the indication of the trigger state; and
        receive the one or more SCell activation reference signals based at least in part on the configuration.

2. The UE of claim 1, wherein the one or more processors, to receive the indication of the trigger state, are configured to:

receive the indication of the trigger state via a medium access control control element (MAC CE) command.

3. The UE of claim 1, wherein the configuration for receiving the one or more SCell activation reference signals comprises one or more indications of:
  a timing parameter of the one or more SCell activation reference signals, the timing parameter based at least in part on a timing offset associated with the trigger state.

4. The UE of claim 1, wherein the one or more processors are further configured to one or more of:
  receive an indication of the number of bits that indicate the trigger state; or
  receive an indication of a format of the indication of the trigger state.

5. The UE of claim 1, wherein the one or more SCell activation reference signals are received via one or more SCells indicated via one or more of:
  an indication received with the indication of the trigger state, or
  an indication associated with the trigger state.

6. The UE of claim 5, wherein the one or more SCells are indicated via the indication associated with the trigger state and additional signaling,
  wherein the additional signaling indicates at least one SCell to be activated.

7. The UE of claim 6, wherein the at least one SCell to be activated includes an SCell that is not one of the one or more SCells.

8. The UE of claim 1, wherein the configuration indicates one or more non-zero-power channel state information reference signal (NZP-CSI-RS) resources, of a set of candidate NZP-CSI-RS resources, for receiving the one or more SCell activation reference signals, and
  wherein the candidate NZP-CSI-RS resources are grouped by associations with one or more NZP-CSI-RS resource sets of a set of candidate NZP-CSI-RS resource sets, and
  wherein the one or more NZP-CSI-RS resource sets are grouped by associations with one or more trigger states, of the set of candidate trigger states.

9. The UE of claim 8, wherein the candidate NZP-CSI-RS resources are:
  a different set of NZP-CSI-RS resources than a set of NZP-CSI-RS resource sets for aperiodic CSI-RSs or tracking reference signals,
  grouped by associations with one or more different NZP-CSI-RS resource sets for aperiodic CSI-RSs or tracking reference signals, or
  grouped by associations with one or more different trigger states for aperiodic CSI-RSs or tracking reference signals.

10. The UE of claim 1, wherein a triggering offset between receiving the indication of the trigger state and a downlink slot containing the one or more SCell activation reference signals is based at least in part on one or more of:
  an indication within one or more non-zero-power channel state information reference signal (NZP-CSI-RS) resource sets associated with the trigger state,
  an indication associated with the one or more SCell activation reference signals, or
  an indication associated with the trigger state.

11. The UE of claim 1, wherein the one or more processors are further configured to:
  receive an indication of a configuration to generate configurations for one or more tracking reference signals;
  generate the configurations for the one or more tracking reference signals; and
  generate configurations for the one more SCell activation reference signals based at least in part on the one or more tracking reference signals.

12. The UE of claim 11, wherein the one or more processors are further configured to receive a set of triggering offsets associated with one or more of:
  the one or more tracking reference signals,
  the one or more SCell activation reference signals, or
  candidate trigger states.

13. The UE of claim 1, wherein the one or more processors are further configured to:
  receive an indication of a sub-selection to indicate a subset of the set of candidate trigger states,
    wherein the indication of the trigger state indicates a selection of a candidate trigger state within the subset of the set of candidate trigger states.

14. A method of wireless communication performed by a user equipment (UE), comprising:
  receiving an indication of a trigger state associated with a configuration for receiving one or more secondary cell (SCell) activation reference signals, wherein the indication of the trigger state includes a number of bits that indicate the trigger state from a set of candidate trigger states via a codepoint associated with the trigger state, and wherein the one or more SCell activation reference signals are located within a downlink bandwidth part indicated via a configuration of a first active downlink bandwidth part as indicated in a communication that is separate from the indication of the trigger state; and
  receiving the one or more SCell activation reference signals based at least in part on the configuration.

15. The method of claim 14, wherein receiving the indication of the trigger state comprises:
  receiving the indication of the trigger state via a medium access control control element (MAC CE) command.

16. The method of claim 14, wherein the configuration for receiving the one or more SCell activation reference signals comprises one or more indications of:
  a timing parameter of the one or more SCell activation reference signals, the timing parameter based at least in part on a timing offset associated with the trigger state.

17. The method of claim 14, wherein the one or more SCell activation reference signals are received via one or more SCells indicated via one or more of:
  an indication received with the indication of the trigger state, or
  an indication associated with the trigger state.

18. The method of claim 17, wherein the one or more SCells are indicated via the indication associated with the trigger state and additional signaling,
  wherein the additional signaling indicates at least one SCell to be activated.

19. The method of claim 14, wherein the configuration indicates one or more non-zero-power channel state information reference signal (NZP-CSI-RS) resources, of a set of candidate NZP-CSI-RS resources, for receiving the one or more SCell activation reference signals,
  wherein the candidate NZP-CSI-RS resources are grouped by associations with one or more NZP-CSI-RS resource sets of a set of candidate NZP-CSI-RS resource sets, and
  wherein the one or more NZP-CSI-RS resource sets are grouped by associations with one or more trigger states, of the set of candidate trigger states.

20. The method of claim 19, wherein the candidate NZP-CSI-RS resources are:
   a different set of NZP-CSI-RS resources than a set of NZP-CSI-RS resource sets for aperiodic CSI-RSs or tracking reference signals,
   grouped by associations with one or more different NZP-CSI-RS resource sets for aperiodic CSI-RSs or tracking reference signals, or
   grouped by associations with one or more different trigger states for aperiodic CSI-RSs or tracking reference signals.

21. The method of claim 14, wherein a triggering offset between receiving the indication of the trigger state and a downlink slot containing the one or more SCell activation reference signals is based at least in part on one or more of:
   an indication within one or more non-zero-power channel state information reference signal (NZP-CSI-RS) resource sets associated with the trigger state,
   an indication associated with the one or more SCell activation reference signals, or
   an indication associated with the trigger state.

22. The method of claim 14, further comprising:
   receiving an indication of a configuration to generate configurations for one or more tracking reference signals;
   generating the configurations for the one or more tracking reference signals; and
   generating configurations for the one more SCell activation reference signals based at least in part on the one or more tracking reference signals.

23. The method of claim 14, further comprising:
   receiving an indication of a sub-selection to indicate a subset of the set of candidate trigger states,
      wherein the indication of the trigger state indicates a selection of a candidate trigger state within the subset of the set of candidate trigger states.

24. The method of claim 14, further comprising:
   receiving an indication of the number of bits that indicate the trigger state.

25. A non-transitory computer-readable medium storing a set of instructions for wireless communication, the set of instructions comprising:
   one or more instructions that, when executed by one or more processors of a user equipment (UE), cause the UE to:
      receive an indication of a trigger state associated with a configuration for receiving one or more secondary cell (SCell) activation reference signals, wherein the indication of the trigger state includes a number of bits that indicate the trigger state from a set of candidate trigger states via a codepoint associated with the trigger state, and wherein the one or more SCell activation reference signals are located within a downlink bandwidth part indicated via a configuration of a first active downlink bandwidth part as indicated in a communication that is separate from the indication of the trigger state; and
      receive the one or more SCell activation reference signals based at least in part on the configuration.

26. The non-transitory computer-readable medium of claim 25, wherein the one or more instructions, that cause the UE to receive the indication of the trigger state, cause the UE to:
   receive the indication of the trigger state via a medium access control control element (MAC CE) command.

27. An apparatus for wireless communication, comprising:
   means for receiving an indication of a trigger state associated with a configuration for receiving one or more secondary cell (SCell) activation reference signals, wherein the indication of the trigger state includes a number of bits that indicate the trigger state from a set of candidate trigger states via a codepoint associated with the trigger state, and wherein the one or more SCell activation reference signals are located within a downlink bandwidth part indicated via a configuration of a first active downlink bandwidth part as indicated in a communication that is separate from the indication of the trigger state; and
   means for receiving the one or more SCell activation reference signals based at least in part on the configuration.

28. The apparatus of claim 27, wherein the means for receiving the indication of the trigger state further comprises:
   means for receiving an indication of the number of bits that indicate the trigger state.

29. The apparatus of claim 27, wherein the first active downlink bandwidth part is configured by radio resource control signaling when the SCell is activated.

30. The apparatus of claim 27, wherein the number of bits is a first number of bits associated with a number of candidate trigger states, the first number of bits being different from a second number of bits used to provide an indication of a trigger state for an aperiodic reference signal.

* * * * *